United States Patent [19]
Welsby et al.

[11] 3,948,546
[45] Apr. 6, 1976

[54] MOLDED STRUCTURES

[75] Inventors: Joseph A. Welsby, Antrim, Ireland;
Kenneth Welch, deceased, late of Armagh, Ireland, by Kathleen J. Welch, executrix

[73] Assignee: The Goodyear Tire & Rubber Company, Akron, Ohio

[22] Filed: Feb. 26, 1973

[21] Appl. No.: 335,963

[30] Foreign Application Priority Data
Mar. 28, 1972 United Kingdom............... 14388/72

[52] U.S. Cl.................................. 285/239; 285/110
[51] Int. Cl.² ......................................... F16L 13/10
[58] Field of Search ............ 285/238, 239, 110, 259

[56] References Cited
UNITED STATES PATENTS
1,980,466  11/1934  Angeja................................ 285/259
1,994,587  3/1935  Nakane............................... 285/239
1,996,855  4/1935  Cheswright......................... 285/239
3,287,033  11/1966  Currie................................. 285/259

FOREIGN PATENTS OR APPLICATIONS
1,223,209  8/1966  Germany............................ 285/239

Primary Examiner—Werner H. Schroeder
Attorney, Agent, or Firm—F. W. Brunner; R. H. Hatton

[57] ABSTRACT

A coupling member for building into the end portion of a hose. The coupling member includes a portion which extends into the bore of the hose body and has one or more annular protuberances extending around the exterior surface. At least one notch extending into one of the protuberances provides a seal to prevent the flow of the fluid passing through the hose from leaking between the outer surface of the coupling member and the hose bore.

4 Claims, 7 Drawing Figures

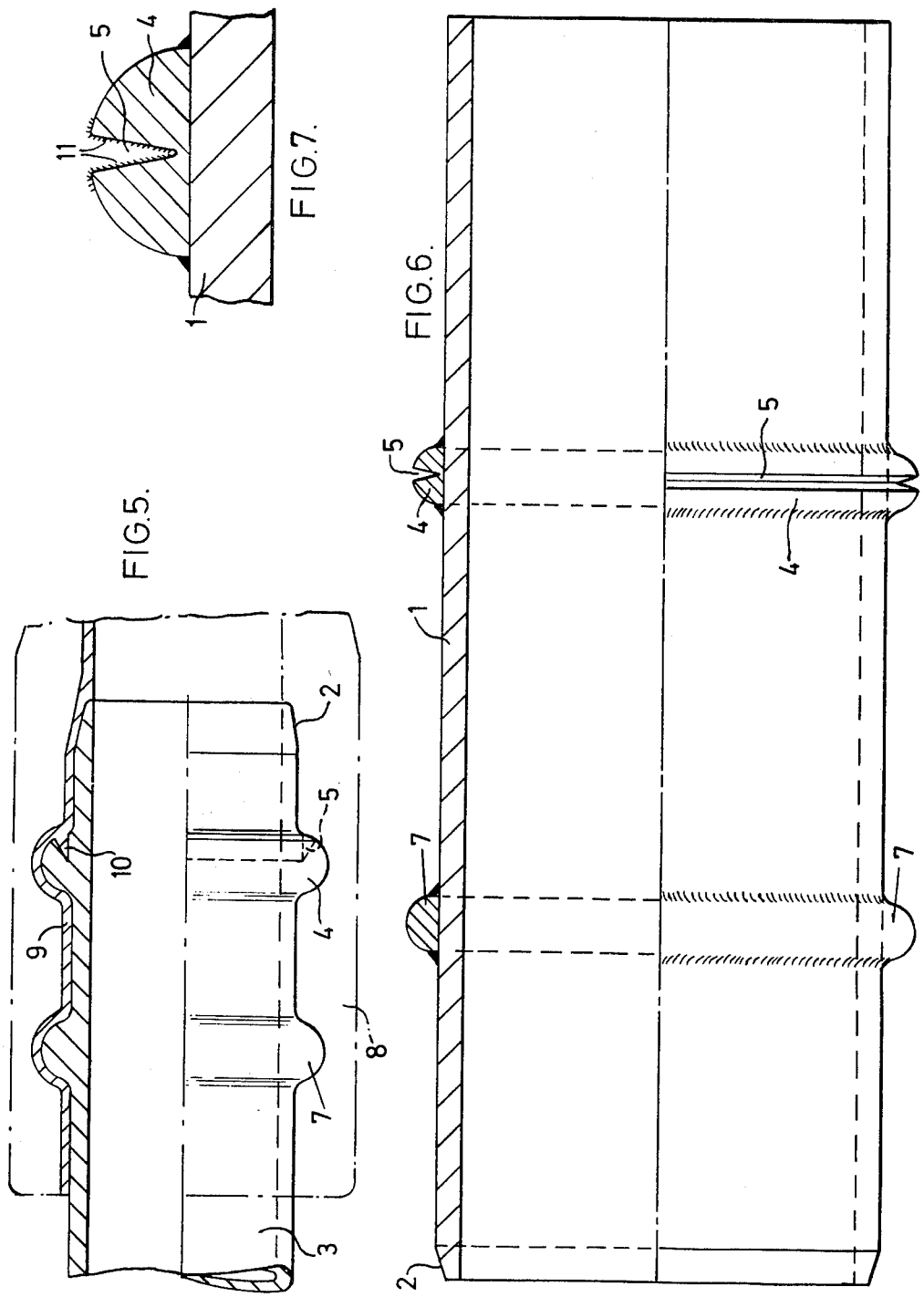

MOLDED STRUCTURES

This invention relates to molded structures and specifically to hose coupling parts comprising a rigid end (generally metallic) member and an elastomeric hose part, an end region of which is secured to said rigid member by a molding operation intended to establish a fluid tight connection as well as a mechanical anchorage. The rigid member will generally be in the form of a nipple, an anchorage portion of which is built into the end of the hose during the construction of the hose and prior to vulcanization.

Difficulties have repeatedly arisen with hose connectors of this kind intended for heavy duty, especially with the larger diameters of hose, associated with the gradual development of leaks. Normally, the elastomeric material of the hose is vulcanized to the metallic nipple, which has various annular protrusions intended to improve the anchorage and the resulting fluid seal. However, even when the application of special cements to the anchorage portion of the nipple prior to vulcanization has been resorted to, it is found that leaks frequently develop after a period of use. It is an object of the invention to provide a design of hose coupling part, with particular reference to the anchorage portion of the nipple or other corresponding rigid parts of the assembly where it is bonded into the end of the hose, to provide an enhanced degree of fluid tight seal. For convenience, the aforesaid rigid part will be referred to hereinafter as a nipple.

According to the invention, a hose coupling member comprises a nipple and an end region of a hose molded thereabout, the nipple being formed with an annular recess occupied by elastomeric material of the hose in the molding operation to define a flexible annular tongue displaceable by fluid under pressure encroaching from within the hose to seal against the adjacent face of the nipple. Conveniently, the annular recess extends in a generally axial direction, and may be formed for example by machining in an annular projection forming part of the nipple. Generally, the nipple will comprise a portion of metallic tubing which may be tapered on its external face at the end which is built into the hose, the other end being threaded, or flanged, or having other means of attachment to a corresponding part. As already mentioned, annular projections of various form may be located on the anchorage portion of the nipple. These may for example take the form of a D-ring, the flat inner face of which may be secured to the remainder of the nipple for example by welding. The annular recess may be machined in the resulting annular protuberance, preferably after the welding operation and preferably at a position raised above the cylindrical surface of the body portion of the nipple to minimize the need to machine into the weld-affected area of the metal.

Where the anchorage of the hose to the nipple is intended to be augmented by the application of adhesive, it is important that the adhesive be kept clear of the recess in which the flexible annular tongue will form since, for the successful operation of the hose coupling portion of the invention, it is essential that this flexible tongue be free to move under the influence of fluid pressure.

The invention will be described further with reference to the drawings accompanying the provisional specification, of which:

FIG. 5 is a view corresponding to FIG. 4 showing the hose-end after vulcanization;

FIG. 6 is a longitudinal part sectional view similar to FIG. 4, and

FIG. 7 is a scrap view of part of FIG. 4 on a larger scale.

The nipple comprises a cylindrical tube portion 1 (which may be of metallic or plastic material) having a tapered end portion 2 for insertion into a hose end region to be vulcanized thereover. Intermediate these ends a D-ring 4 is welded at each side to the tubular portion 1, and machined to provide an annular recess 5 having the form of an undercut. As shown, the base of the recess 5 is substantially co-axial with the outer face of the tubular portion 1. When the nipple is inserted into an end region of a hose to be vulcanized so that the D-ring 4 (but not the whole of the nipple) is covered, and then the vulcanization effected under heat and pressure, a tongue of the elastomeric material of the hose enters the recess 5 to define a flexible lip seal serving the purpose already indicated.

Figure 1:
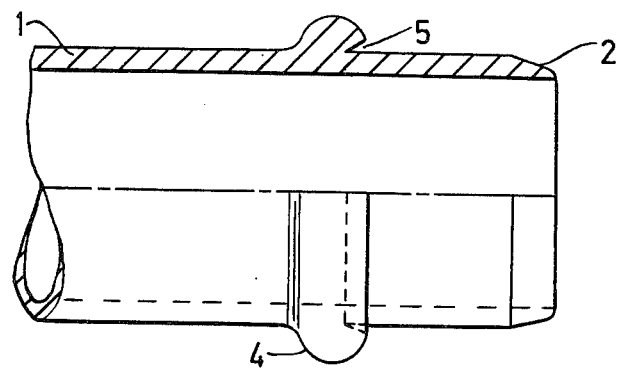
FIG. 1 is a longitudinal part sectional view of a nipple prepared for use in accordance with the invention.
Figure 2:
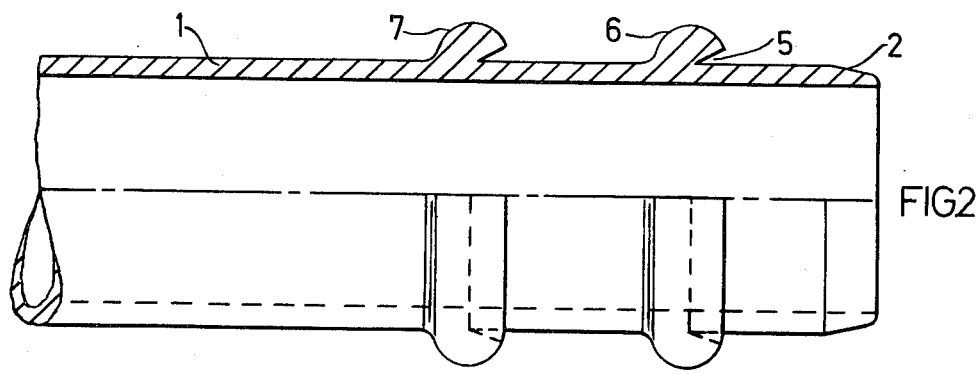
FIGS. 2 and 3 illustrate modifications with double annular protuberances.
Figure 3:
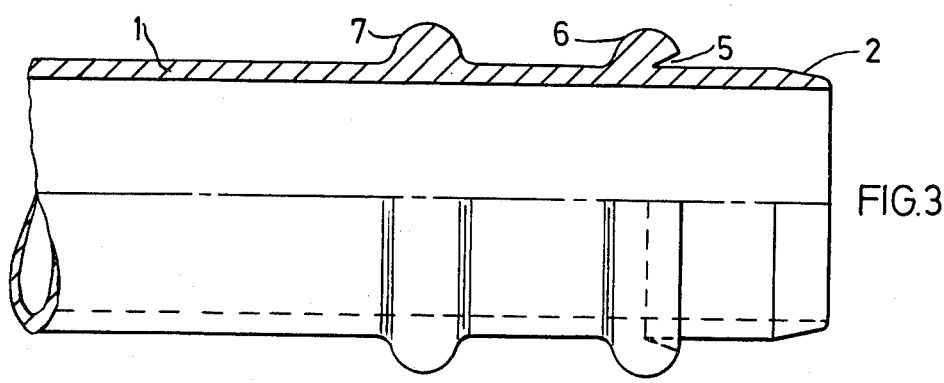

As illustrated in FIG. 2, the D-ring 4 can be duplicated as at 6 and 7; FIG. 2 shows how each can define a recess as illustrated in FIG. 1, whereas FIG. 3 shows how this recess may be confined to one of the rings 6, 7.

Figure 4:
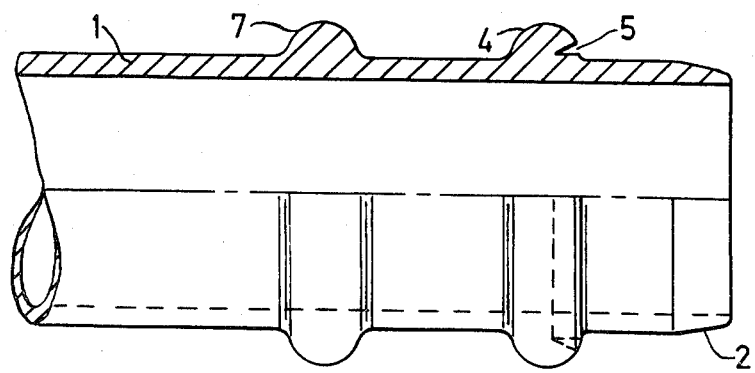
FIG. 4 is a like view illustrating a preferred form of annular recess.

FIG. 4 illustrates a preferred configuration of recess, in which the D-ring 4 is cut generally in the manner illustrated in FIG. 1 but starting at a greater diameter so that the resulting annular recess 5 is largely clear of the weld area at the base of the ring 4. Not only does this make for easier machining in that the cutting tool is well clear of the tubular portion 1, but the cut is made into metal which is less effected by the welding operation. Further, as illustrated in FIG. 4, the recess 5 will normally taper but, as contrasted with FIG. 1, may have a blunt base.

The vulcanized-on hose end portion is shown in FIG. 5. The hose comprises a body portion 8 and a lining 9. It is some of the substance of the latter which enters the recess 5 and, in the vulcanizing operation, forms the resilient sealing tongue 10. The hose covers only part of the nipple, leaving an end portion 3 (only some of which is shown) for attachment to or engagement with a corresponding part of a complete hose union.

In FIG. 6 the same reference numerals are used as in FIG. 4. Referring particularly to FIG. 7, a surface area 11 constituted by the surface of the groove and a small area immediately adjacent to the groove are treated to prevent the establishment of a bond between the material (generally metal) of the nipple and the rubber composition which will be applied as the hose is built. Suitably, for example, the area 11 is coated, e.g. by brushing or spraying, with an adhesive composition such as a silicone grease. As the hose is subsequently built, the groove 5 is filled completely using the hose tube compound. As the hose is cured, a lip is molded conforming to the shape of the groove, as in FIG. 5 (the lip 10). The mating lip 10 and groove 5 form together a pressure seal against fluid passing between the nipple and hose, because pressure exerted on one side of the lip forces it against the opposite side of the groove.

While certain representative embodiments and details have been shown for the purpose of illustrating the invention, it will be apparent to those skilled in this art that various changes and modifications may be made therein without departing from the spirit or scope of the invention.

What is claimed is:

1. A hose coupling member for incorporating into a laminated hose structure having an inner layer of elastomeric material, said member including a rigid nipple with the hose body formed therearound and having the inner layer thereof being adhered generally to the nipple surface, at least one outwardly extending generally semi-circular annular projection on the outer surface of said nipple and engaging said inner layer of elastomeric material of said hose, a V-shaped recess formed in said projection radially outwardly of the nipple surface, the inner elastomeric layer of the hose filling said recess without being adhered to the faces thereof to form a sealing tongue which, by the pressure of the fluid passing between the inner layer of the hose and the nipple surface, is urged into sealing engagement with the recess face opposite to the one along which the fluid enters said recess thus preventing flow of liquid beyond the recess.

2. A hose coupling member as claimed in claim 1 in which there are at least two annular projections on the outer surface of the nipple with a V-shaped recess in at least one of said projections.

3. A hose coupling member as claimed in claim 1 in which the V-shaped recess extends in a substantially axial direction.

4. A hose coupling as claimed in claim 1 in which the inner layer of the hose is bonded to the nipple surface by an adhesive applied to the nipple surface but not to the surface of the V-shaped recess.

* * * * *